July 15, 1958  W. F. MATRAS  2,842,887
KNOB AND WIRE HOOK ASSEMBLY FOR FISHING AND THE LIKE
Filed March 11, 1955
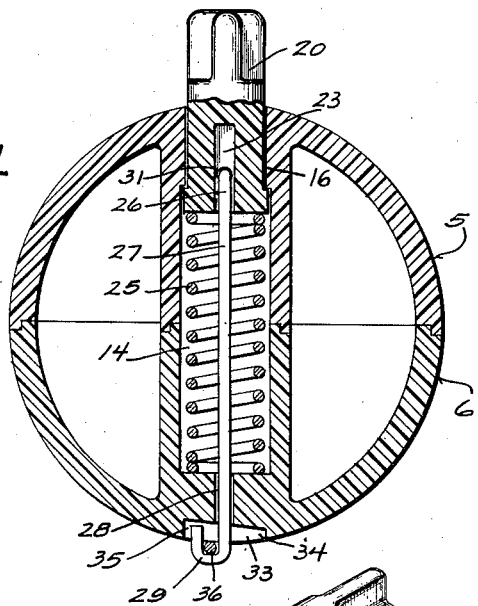
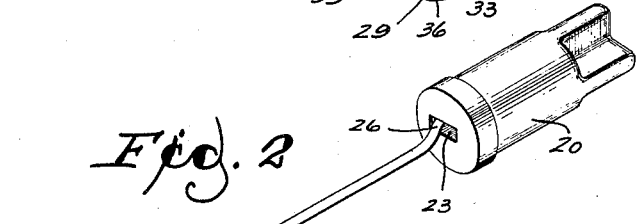
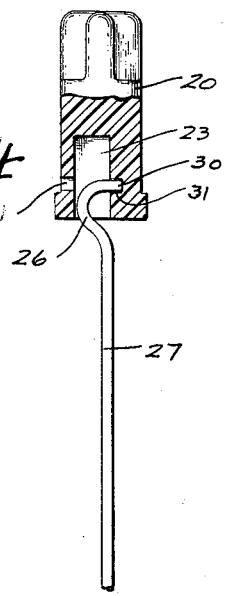
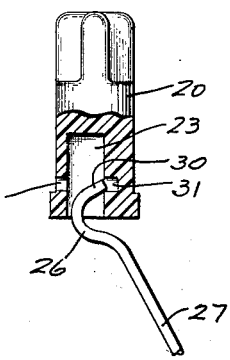
INVENTOR.
WILLIAM F. MATRAS
BY
Wheeler, Wheeler & Wheeler
ATTORNEYS United States Patent Office 2,842,887
Patented July 15, 1958

2,842,887

KNOB AND WIRE HOOK ASSEMBLY FOR FISHING AND THE LIKE

William F. Matras, Milwaukee, Wis., assignor to Frabill Manufacturing Co., Milwaukee, Wis., a corporation of Wisconsin Application March 11, 1955, Serial No. 493,778

5 Claims. (Cl. 43—44.95)

This invention relates to a knob and wire hook assembly for fishing and the like. The structure is generally similar to that disclosed in the copending application for a patent on a fishing bobber, Serial No. 469,391, filed November 17, 1954, now Patent No. 2,719,381.

In the companion application above identified, the line engaging hook had its shank connected with a push button at the opposite end of the bobber by deforming the material of the push button into an eye carried by the shank. While this has advantages over previously known means of connecting the shank with the push button, it has been found that in a certain number of items, the operators do not connect the parts in perfect alignment.

The present invention meets this difficulty and assures a self-aligning connection between the parts by providing the shank rod with a laterally projecting hook like terminal instead of a loop and transversely boring the button to intersect the shank receiving slot to provide a socket into which the hook like terminal of the shank rod can be manipulated during assembly, but from which it cannot escape after being incorporated into the bobber.

In the drawings:

Fig. 1 is a view in central vertical cross section of a bobber assembly incorporating the present invention.

Fig. 2 is a detail view in perspective of the assembled button and hook shank wire.

Fig. 3 is a detail view showing the hook shank wire and push button in process of assembly, portions of the button being broken away.

Fig. 4 is a view similar to Fig. 3 showing the assembly completed.

The parts 5 and 6 comprising the float and the compression spring 25 used within the spring chamber 14 provided by the float, conform in all respects with the disclosure of the companion application 469,391 aforesaid. As in the device of the said application, the portion 6 of the float provides a bore at 28 for the shank rod 27 of the line engaging hook 29, the hook being rotatable in the pocker 33 of the float to be positioned in the shallow end 34 or the deep end 35 of such pocket whereby the line 36 may be left free to run through the hook, or may be clamped by the hook against the surface of the float.

The push button 20 serves not only to displace shank rod 27 and hook 29 in a direction axial of the shank rod and against the compression of spring 25, but it also serves to rotate the hook. To this end, the push button 20 has a transverse slot at 23 disposed laterally of its center and into which the upper end of the hook shank rod 27 is received.

In the companion application above identified, the shank rod is keyed to the button by being provided with an eye or loop. In the present device, the upper end of the shank rod 27 is provided with a half loop at 26 from which the terminal hook-like portion 30 projects laterally. A very fine drill is used to bore a small hole 31 through the side of the push button 20 and, desirably, across the slot 23 to provide a socket into which the hook portion 30 of shank rod 27 may be engaged. Thus the half loop 26 is disposed in slot 23 to engage the button at one side of its axis, while the terminal portion 30 extends across the axis into said socket to engage the button at the other side of its axis.

To assemble the parts, it is necessary that the terminal hook portion 30 of shank rod 27 be introduced first into the slot 23, the rod being at a relatively sharp angle to the axial position which it will ultimately occupy. This step is illustrated in Fig. 2 and Fig. 3. In the angled position of the parts shown in Fig. 3, it is readily possible to engage terminal portion 30 into the socket provided for it by hole 31, and, thereupon, to swing the rod 27 into axial alignment with button 20 as shown in Fig. 4. The parts may then be assembled and the hook 29 formed to complete the organization as shown in Fig. 1, whereupon the engagement of the shank rod 27 in guide bore 28 of the float precludes relative angular movement between the shank rod and the push button 20 in any manner which could result in disengagement.

The resulting assembly is completely self-aligning, the connection between the shank rod and the button permitting adequate angular movement to preclude the possibility of binding of the button or the shank rod in their respective bearings in the float, the shank rod being reciprocal in bore 28 and the button in bore 16, as in the device of the companion application.

The labor cost in making this assembly is materially less than that required for the device of the companion application and the problem of misalignment is wholly eliminated. It is believed that the connection provided between the button and the shank or rod is desirable for use in any similar organizations in which corresponding problems may exist.

I claim:

1. In a device of the character described, the combination with a float having a bore providing aligned bearings, of a line attachment for said float including a spring biased push button and a rod in the respective bearings in which the button is provided with a transverse slot extending laterally of its longitudinal axis, and the rod is provided with a half loop received in the slot and having a free terminal portion transverse to the axis of said rod and projecting across said longitudinal axis of said button, the button having a socket portion in which said terminal portion is relatively loosely engaged, said rod having a hook portion adapted to cooperate with a portion of said float to clamp a line therebetween.

2. The device of claim 1 in which the button and rod are rotatably mounted in said aligned bearings, the said engagement between the rod and button keying the rod to rotate with the button while permitting sufficient relative universal movement to preclude binding in said bearing means.

3. In a device of the character described, the combination with a fishing bobber float having aligned rod and button bearings, of a line attachment for said float including a rod in the rod bearing and provided at one end with a portion extending laterally at one side of the rod axis and thence toward the axis to a projected free terminal portion transverse to the axis of the rod at the other side of such axis, of a spring biased button in the button bearing and having a slot including a portion laterally offset from the rod axis and having a socket at the other side of the axis, the laterally projecting portion of the rod being positioned in the laterally offset portion of the slot and the terminal portion aforesaid being relatively loosely positioned in the socket, said rod having a hook portion adapted to cooperate with a portion of said float to clamp a line therebetween.

4. The device of claim 3 in which the said terminal portion is confined against withdrawal from the socket when the axis of the rod is aligned with said slot in said button, said bearing means engaging said button and rod for maintaining the same in axial alignment, whereby separation of the button and rod is precluded.

5. In a fishing bobber, the combination with a float having a button bearing and a hook shank bearing, of a line engaging hook having a shank rod engaged in the hook shank bearing, a button disposed in the button bearing and provided with a slot extending longitudinally of the button and having a portion laterally offset from the longitudinal axis thereof, said button having a transverse bore forming a socket at the side of the button opposite the offset portion of said slot, said shank rod having a laterally extending free portion received in the slot and a terminal portion extending across the projected longitudinal axis of the shank rod and engaged relatively loosely in said socket, the said portions of the shank rod connecting the shank rod with the button for movement as a unit axially and rotatably with respect to said float bearings, while accommodating sufficient angular movement between the shank rod and the button to preclude the binding of the shank rod and button in their respective bearings.

References Cited in the file of this patent

UNITED STATES PATENTS

| | | |
|---|---|---|
| 1,072,005 | Hartley | Sept. 2, 1913 |
| 2,255,853 | Makus et al. | Sept. 16, 1941 |
| 2,500,677 | Harris | Mar. 14, 1950 |
| 2,627,693 | Wanner | Feb. 10, 1953 |
| 2,670,560 | Matras | Mar. 2, 1954 |
| 2,719,381 | Matras | Oct. 4, 1955 |
| 2,767,506 | Robinson | Oct. 23, 1956 |